United States Patent [19]
Berger et al.

[11] Patent Number: 6,043,391
[45] Date of Patent: Mar. 28, 2000

[54] ANIONIC SURFACTANTS BASED ON ALKENE SULFONIC ACID

[76] Inventors: Paul D. Berger; Christie H. Berger; Iris K. Hsu, all of 3014 Deer Creek Dr., Sugarland, Tex. 77478

[21] Appl. No.: 09/009,016

[22] Filed: Jan. 20, 1998

[51] Int. Cl.[7] .................................................. C07F 5/02
[52] U.S. Cl. ........................ 562/41; 507/259; 507/936
[58] Field of Search ................................ 562/41; 507/259

[56] References Cited

U.S. PATENT DOCUMENTS

| | | | |
|---|---|---|---|
| 2,366,133 | 12/1944 | Suter | 562/41 |
| 2,572,605 | 10/1951 | Ficke et al. | 562/95 |
| 3,444,191 | 5/1969 | Nielson et al. | 562/123 |
| 3,502,716 | 3/1970 | Kite et al. | 562/117 |
| 3,555,508 | 1/1971 | Moulden et al. | 585/311 |
| 3,585,253 | 6/1971 | Huang et al. | 585/660 |
| 3,683,013 | 8/1972 | Walz et al. | 562/78 |
| 3,816,520 | 6/1974 | Juelke et al. | 562/77 |
| 3,845,114 | 10/1974 | Sweeney et al. | 562/108 |
| 3,951,823 | 4/1976 | Straus et al. | 507/102 |
| 3,953,338 | 4/1976 | Straus et al. | 507/102 |
| 4,004,638 | 1/1977 | Burdyn et al. | 166/270.1 |
| 4,180,691 | 12/1979 | Illingworth | 585/455 |
| 4,220,204 | 9/1980 | Hughes et al. | 166/270.1 |
| 4,536,301 | 8/1985 | Malloy et al. | 507/259 |
| 5,049,311 | 9/1991 | Rasheed et al. | 252/389.52 |
| 5,208,390 | 5/1993 | Onopchenko et al. | 568/766 |
| 5,344,967 | 9/1994 | Schnur et al. | 562/94 |

FOREIGN PATENT DOCUMENTS

| | | |
|---|---|---|
| 121964 | of 0000 | European Pat. Off. . |
| 2232428 | 12/1990 | United Kingdom . |

OTHER PUBLICATIONS

J.K. Weil, A.J. Stirton and F.D. Smith: Sulfonation of Hexadacene–1 and Octadecene–1, J. Am. Chemists Society; V , Oct. 1965, 873–875.

W.C. Ault, and A. Eisner: Improved Yields in the Acid Catalyzed Addition of Phenols 6 Phenyl Esters to Oleic Acids; JOACS, vol. 39, Feb. 1962, pp 132–133.

Griendt et al , Aromatic Sulfonation, Laboratory for Organic Chemistry, p. 13–18, Jan. 1980.

*Primary Examiner*—Gary Geist
*Assistant Examiner*—Taylor V. Oh
*Attorney, Agent, or Firm*—Michael B. Jolly

[57] ABSTRACT

New anionic surfactants and methods of preparation which are derived from aromatic or substituted aromatic molecules and alkenesulfonic acid. Wherein the aryl compound is alkylated and sulfonated in one-step with an alkene sulfonic acid prior to sulfonic acid neutralization. The methods allow the functional sulfonate group to be attached to the end of the alkyl chain rather than to the aromatic ring thus allowing for selective substituted groups, either branched, linear or alkoxylated or combinations thereof to be placed on the aryl compound prior to sulfonation and alkylation. The invention uses the alkene sulfonic acid produced from thin-film sulfonation of an alpha-olefin to alkylate benzene, mono-substituted aromatic, poly-substituted aromatic, alkylbenzene, alkoxylated benzene, polycyclic aromatic, mono-substituted polycyclic aromatic, poly-substituted polycyclic aromatic, naphthalene, alkylnaphthalene, phenol, alkylphenol, alkoxylated phenol, and alkoxylated alkylphenolalkyl substituted or polysubstituted cyclic or polycyclic compounds to produce the corresponding sulfonic acid having an additional alkyl group derived from the alpha-olefin used during the thin-film sulfonation which is either linear or branched.

28 Claims, 3 Drawing Sheets

ANIONIC SURFACTANTS BASED ON ALKENE SULFONIC ACID

BACKGROUND OF THE INVENTION

1. Field of the Invention

The present invention relates to new anionic surfactants derived from aromatic or substituted aromatic molecules and alkene sulfonic acid. More particularly this invention relates to alkyl, dialkyl and higher substituted aromatic sulfonates and methods for preparing the substituted aromatic sulfonates wherein an aryl compound is alkylated and sulfonated in one step with an alkene sulfonic acid prior to neutralizing the acid.

The new surfactants and the new method to prepare them have the following advantages over existing aromatic sulfonate type surfactants:

1. Dialkyl and higher substituted aromatic sulfonates can be produced easily and in high yields.
2. Alkoxylated aromatic sulfonates can be produced easily and in high yields.
3. Mixed linear and branched substituted di-alkylaromatics can be produced easily and in high yields.
4. Alkyl benzene sulfonates can be produced without using, presently costly, conventional alkylation processes.
5. Sulfonated alkyl phenol alkoxylates can be produced without using, presently costly, conventional alkylation processes.
6. The new surfactants possess a unique structure where the sulfonate group is attached to the end of one of the alkyl chains rather than to the aromatic ring.

2. The Prior Art

Alkyl benzene sulfonates have been popular surfactants for a wide variety of detergent and industrial use. Beginning just after World War II, synthetic detergents based on the reaction of propylene tetramer and benzene using $AlCl_3$ catalyst began to gain popularity and widespread use as laundry detergents. During the 1960s alkylbenzene sulfonates based on branched alkyl groups were found to be causing excessive foaming in sewage treatment plants and in rivers and lakes due to their slow biodegradability. Linear alkylbenzenes based on the reaction of linear olefins (U.S. Pat. No. 3,585,253 issued to Huang on Jun. 15, 1971) or linear chloroparaffins (U.S. Pat. No. 3,355,508 issued to Moulden on Nov. 28, 1967) were developed which gave acceptable detergency and were quickly biodegraded. Even more recently, the $AlCl_3$ process has been replaced by the HF process and the Detal Process because of environmental objections to the $AlCl_3$ process. Table 1 shows the typical yields obtained for detergent alkylates using HF catalyst.

TABLE 1

Typical Yields of Detergent Alkylate (values in tons)

|  | Branched Alkylate | Linear Alkylate |
|---|---|---|
| Material Charged |  |  |
| Linear Paraffins | — | 82.9 |
| Benzene | 39.9 | 34.3 |
| Propylene tetramer | 86.7 | — |
| Total charged | 126.6 | 117.3 |

TABLE 1-continued

Typical Yields of Detergent Alkylate (values in tons)

|  | Branched Alkylate | Linear Alkylate |
|---|---|---|
| Materials Produced |  |  |
| Hydrogen | — | 1.1 |
| Light ends | — | 3.8 |
| HF regenerator bottoms | 2.5 | 2.8 |
| Light alkylate | 8.0 | — |
| Detergent alkylate | 100.0 | 100.0 |
| Heavy alkylate | 16.1 | 9.6 |
| Total produced | 126.6 | 117.3 |

Detergent use is the predominant market for alkylbenzenes and alkylbenzene sulfonates. These products; however; are also employed in considerable quantities as lubricants, coolants, industrial surfactants, dispersants, emulsifiers, corrosion inhibitors, demulsifiers and for many other uses. They find widespread use in many industries among which are petroleum recovery, refining, emulsion polymerization, textile dyeing, agriculture, industrial and institutional cleaning, drilling fluids, paper processing, coatings, and adhesives.

Present processes are designed to optimize the yields of detergent alkylate (predominantly monoalkylbenzene). The yields of heavy alkylate (predominantly dialkylbenzene) are therefore low. These heavy alkylates however find considerable demand as oil soluble surfactants and specialty chemicals. Dialkylbenzene sulfonates (U.S. Pat. No. 4,004,638 issued to Burdyn, Chang and Cook on Jan. 25,1977, U.S. Pat. No. 4,536,301 issued to Malloy and Swedo on Aug. 20, 1985), alkyl xylene sulfonates (EP121964) and dialkyl phenol polyethoxy alkyl sulfonates (U.S. Pat. No. 4,220,204 issued to Hughes, Kudchadker and Dunn on Sep. 2, 1980) have all been used to increase the productivity of crude oil; however; the availability of these materials has been limited until this invention because of the low yields of heavy alkylates available for conversion to their corresponding sulfonates. In addition no commercially feasible process is available, until this invention, for producing di- and tri-alkylbenzenes where both linear and branched alkyl groups are present on the same benzene ring.

Alkoxylated Alkyl Substituted Phenol Sulfonates have been produced and found to be useful as surfactants in numerous applications. U.S. Pat. No. 5,049,311 issued to Rasheed, Cravey, Berger and O'Brien on Sep. 17, 1991, lists many uses for these compounds including surfactants for Enhanced Oil Recovery, corrosion inhibitors, hydrotropes, foaming agents in concrete formation, surfactants for dye carriers, surfactants for fiber lubricants, surfactants for emulsion polymerization, textile detergents, foaming agents for drilling fluids, and agricultural emulsifiers.

SUMMARY OF INVENTION

The present invention resides in an improved process for producing novel sulfonated alkylaromatic compounds in which the aromatic group is sulfonated and alkylated in one step. The invention uses alkene sulfonic acid produced by the thin film sulfonation of an alpha-olefin to alkylate an aromatic compound such as benzene or naphthalene or a substituted aromatic compound such as alkylbenzene or alkylnaphthalene or phenol or alkoxylated phenol or alkoxylated alkylphenol to produce the corresponding sulfonic acid having an additional alkyl group derived from the alpha-olefin used during the reaction. The subsequent sulfonic acid may be used "as is" or neutralized with a variety of cations such as Na, K, Ca, Mg, Ba, NH$_4$, MEA, DEA, TEA, iso-Propanol Amine, and other amines, etc. to form anionic surface active agents.

Thus a benzene or a substituted aromatic compound of the formulation shown below is used. Naphthalene and any other polycyclic aromatic may be substituted for benzene with similar results and offer the additional advantage of forming di- and higher sulfonate derivatives. Where none is defined as no substitution or H in the structure below.

R=none, alkyl (branched or linear $C_1$ to $C_{30}$+) or alkoxylate (EO, PO, BO or mixtures)

R'=none, alkyl (branched or linear $C_1$ to $C_{30}$+)

R"=none, alkyl (branched or linear $C_1$ to $C_{30}$+)

The benzene or substituted aromatic compound is reacted with the alkenesulfonic acid produced from the sulfonation of an alpha-olefin. The sulfonation of an alpha-olefin produces a mixture of alkene sulfonic acid and sultone whose composition is shown below. Alkene sulfonic acid is the precursor to alpha-olefin sulfonate or AOS which is a widely used surfactant with many applications for foaming, cleaning, emulsifying, and wetting. Alkene sulfonic acid is produced through the reaction of $SO_3$ with mono-olefinic hydrocarbon as known in the art (U.S. Pat. Nos. 2,061,617; 2,572,605 issued to Fincke on Oct. 23, 1951; 3,444,191 issued to Nelson on May 13, 1969). A process for producing high yields of alkene sulfonic acids is revealed by Weil, Stirton and Smith in JAOCS Vol. 41, October 1965, pp 873–875.

$CH_3(CH_2)nCH=CHCH_2SO_3H$
alkene sulfonic acid sultone

The ratio of alkene sulfonic acid to sultone is from 1:1 to about 1:4 depending on manufacturing temperature, pressure, flow rates and other parameters known to those skilled in the art. The position of the double bond of the alkene sulfonic acid and the number of carbons in the sultone ring can also vary depending on these same parameters.

The alpha olefin sulfonic acid is reacted with benzene or substituted aromatic compounds at elevated temperature up to just under the decomposition temperature of the reactants and in the presence of a limited amount of water. A catalysts has been found useful to reduce the reaction temperature, the reaction times and improve yields. Useful catalysts include $H_2SO_4$, methane sulfonic acid, sulfosuccinic acid, and other strong acid catalysts generally used for alkylation. Higher temperatures, up to the decomposition temperatures of the reactants are preferred. Pressure may be necessary to reach the desired higher temperatures when using low boiling starting materials such as benzene and to prevent water from escaping during the early stages of the reaction. The alkali or alkaline metal salts of various carboxylic acids such as acetic, propionic or carbonates such as sodium or potassium carbonate may be used as catalysts if the corresponding alkali or alkaline earth sulfonate salt is desired rather than the free sulfonic acid. The reaction results in the product shown below. The free acid may be further reacted with any of a number of cations such as Na, K, NH4, Ca, Mg, Ba, Amines, etc. to form anionic surface active salts. Naphthalene and any other polycyclic aromatic may be substituted for benzene with similar results. None is defined as no substitution or H and the sum of n and m are defined as $\geq 5$.

R=none, alkyl (branched or linear $C_1$ to $C_{30}$+) or alkoxylate (EO, PO, BO or mixtures)

R'=none, alkyl (branched or linear $C_1$ to $C_{30}$+)

R"=none, alkyl (branched or linear $C_1$ to $C_{30}$+)

R'''=$CH_3(CH_2)nCH(CH)_2mSO_3H$

Thus it is an object of the present invention to provide a one-step method of producing useful anionic surfactants which are derived from mono-substituted, and poly-substituted aromatic sulfonates. We define poly-substituted as having two or more substituents on an aromatic compound. More particularly the object of the present invention is to provide novel compounds and their methods of production wherein an aromatic compound is alkylated and sulfonated in one-step with an alkene sulfonic acid prior to neutralizing the acid. The alkene sulfonic acid may include an alkyl group which is either linear or branched, while the sulfonation leads to the formation of a product which has the functional sulfonate group attached to the alkyl group rather than the aromatic ring.

Furthermore, it is an object of the present invention to provide methods of producing mono-, and poly-substituted alkylaromatic compounds where both linear and branched alkyl groups may or may not be present on the same cyclic ring.

Additionally, it is an object of the present invention to provide a one-step method of producing mono-substituted, and poly-substituted alkylaromatic sulfonates whereby a alkene sulfonic acid is used to alkylate benzene, naphthalene, a monosubstituted aromatic compound, and a poly substitiuted aromatic compound, prior to neutralization of the sulfonic acid, to produce the corresponding sulfonic acid having the additional alkyl group derived from the alpha-olefin used in the sulfonation and wherein the method includes recycling water and unreacted aromatic to increase the yield of the alkylaromatic sulfonic acid.

DETAILED DESCRIPTION OF THE INVENTION

Alpha-Olefin sulfonates are widely used as surfactants for personal care, emulsion polymerization, fire-fighting foam and a wide variety of other uses. These materials are produced by the sulfonation of an alpha-olefin using a thin film $SO_3$ reactor. Weil, Stirton and Smith (JOACS Vol 42, October 1965, pp 873–875) describe the reaction of hexadecene-1 and octadecene-1 with $SO_3$ followed by neutralization with NaOH to form the corresponding hexadecene sulfonates. The inventors note that the final product is not a single component but predominantly a mixture of two materials. These are the alkene sulfonate and the hydroxyalkane sulfonate. The hydroxyalkane sulfonate is present due to the formation of an intermediate sultone when $SO_3$ reacts with the alpha olefin. Neutralization with NaOH not only neutralizes the acid formed from this reaction but also opens the sultone ring forming additional alkene sulfonate and hydroxyalkane sulfonate. This results in a final product having approximately the following composition shown in Table 2:

TABLE 2

Typical Products of Alpha-Olefin/$SO_3$/NaOH Reaction

| Component | Approximate Amount by Weight |
|---|---|
| Alkene Sulfonate | 60–70% |
| 3-Hydroxy Sulfonate + 4-Hydroxy Sulfonate | 30% |
| Disulfonates | 0–10% |

U.S. Pat. No. 3,845,114 issued to Sweeney and House on Oct. 29, 1974, teaches that the addition of limited amounts of water to AOS acid and the subsequent heating to 150° C. converts the sultone to alkene sulfonic acid and hydroxyalkane sulfonic acid. The presence of water during the ring-opening prevents dimerization of the alkene sulfonic acid. Removal of the water dehydrates the hydroxyalkane sulfonic acid back to sultone but leaves the alkene sulfonic acid intact. Repeating the process of adding limited amounts of water, heating to 150° C. and removing the water reduces the hydroxyalkane sulfonic acid content and increases the alkene sulfonic acid content. This process is shown below.

In another early study, Ault and Eisner (JOACS Vol 39, February 1962, pp 132–133), describe the acid catalyzed addition of phenols and phenyl ethers to oleic acid. They discovered that by using an acid catalyst, such as polyphosphoric acid or methane sulfonic acid, they could produce aryl substituted stearic acids as shown below.

U.S. Pat. No. 3,502,716 issued to Kite on Mar. 24, 1970, uses alkali or alkaline earth metal carboxylates reacted at high temperature with hydroxy sulfonic acid anhydrides to produce the corresponding alkali or alkaline earth alkene sulfonate salts. This work does demonstrate that AOS acids can be predominantly converted to salts of alkene sulfonic acids at high temperatures.

U.S. Pat. No. 3,951,823 issued to Straus, Sweeney, House and Sharman on Apr. 20, 1976, teaches the reaction of AOS acid with itself and other sulfonated monomers to produce disulfonated dimers having good foaming properties for use in foam well cleanout applications. This reference specifically requires that both monomers contain a sulfonate group. This reference teaches that suitable starting materials must contain at least about 5 nonaromatic carbon atoms per molecule, a sulfonate functional group, i.e., —$SO_3$—, and one of the following: (1) a carbon-carbon double bond, i.e., —CH=CH—; (2) an alkanol hydroxy group, or a sulfonate ester group of which the above sulfonate group is a component, i.e., a sultone, and the functional groups must be substituents attached to non-aromatic carbon atoms with the balance being carbon and/or hydrogen.

Despite the prior innovations, and probably because di-substitute and higher substituted aromatic sulfonates were considered undesirable by-products, those skilled in the art have never attempted to use the AOS acid from the reaction of an alpha-olefin and $SO_3$, before neutralization, to simultaneously alkylate and sulfonate an aryl compound such as benzene, naphthalene, or substituted benzene, and naphthalenes.

The present invention forms new sulfonic acid and sulfonate derivatives by the simultaneous alkylation and sulfonation of aromatic compounds resulting in the formation of sulfonic acids and sulfonate derivatives which are useful as anionic surface active agents. The acid from the reaction of an alpha-olefin and $SO_3$, and the subsequent repeated hydrolysis and dehydration with water results in the formation of alkene sulfonic acid as taught by U.S. Pat. No. 3,845,114 We have found that this strong acid can be used to alkylate aromatic compounds. An additional strong acid catalyst is beneficial to obtain useful yields of final product. In contrast to U.S. Pat. No. 3,951,823, our invention does not require that the reactants both contain at least about 5 nonaromatic carbon atoms per molecule, a sulfonate functional group, i.e., —$SO_3$—, and one of the following: (1) a carbon-carbon double bond, i.e., —CH=CH—; (2) an alkanol hydroxy group, or a sulfonate ester group of which the above sulfonate group is a component, i.e., a sultone, and the functional groups must be substituents attached to non-aromatic carbon atoms with the balance being carbon and/or hydrogen. In fact the most preferred starting materials such as benzene, naphthalene, alkylbenzenes and alkylnaphthalenes do not meet any of the criteria mentioned in U.S. Pat. No. 3,951,823.

EXAMPLE 1

78.0 g Benzene (1.00 Mole) was added to a five necked, 2000 ml round-bottom flask equipped with blade stirrer, thermometer, and water condenser. The two empty fittings were closed with ground glass stoppers. Table 3 list the charge for Example 1. While stirring, 240 g (0.839 Mole) of AOS acid (EW=286), having the analysis shown in Table 4 below, was added at 21° C. The temperature was gradually raised to 110° C. over a 3 hour period. A collection tube was added to recover any unreacted benzene that distilled over. The mixture was held at 110° C. until no benzene was observed distilling off. The recovered benzene was weighed and the activity of the alkylbenzene sulfonic acid was determined from the acid value and CID activity (2-phase titration) of the material remaining in the flask. 48.9 g of benzene were recovered. 266.3 g of product remained in the flask. The percent conversion was calculated as follows:

100×((78.0 g−48.9 g)/(0.8×78 g))=46.6%

Activity of the product, determined by CID titration was found to be 44.4%. As is known to those skilled in the art, CID titration using Hyamine 1622 is a method of determining surfactant activity of anionic materials. The surface tension at 22° for a 0.10% solution neutralized to pH 7.0 with NaOH was found to be 42.9 mN/m and the critical micelle concentration (CMC) was found to be 0.05%.

TABLE 3

Material Charge for Example 1

| MATERIAL | MW | AMOUNT,g | MOLE RATIO |
|---|---|---|---|
| Benzene | 78.0 | 78.0 | 1.00 |
| AOS Acid | 286.0 | 240.0 | 0.839 |

TABLE 4

Analysis of AOS Acid

| PROPERTY | ANALYSIS |
|---|---|
| Acid Value, meq/g | 1.55 |
| CID Activity, meq/g | 1.53 |
| Average Molecular Weight, Calc | 286 |
| C14, % | 65 |
| C16% | 35 |

EXAMPLE 2

78.0 g Benzene (1.00 Mole) was added to a stainless steel 2 liter Parr Bomb reactor equipped with stirring, heat control, cooling cool and 300 PSI rupture disk. 28.3 g (0.100 Mole) of 70% sulfosuccinic acid catalyst which contained 8.49 g $H_2O$ was added. While stirring, 301 g (1.05 Mole) of AOS acid (EW=286), having the analysis shown in Table 4 above, was added at 21° C. The charge for Example 2 is listed in Table 5. The temperature was gradually raised to 150° C. and held at temperature for 4 hours. After 4 hours the temperature was lowered to below 110° C. and all the unreacted benzene and water was allowed to distill off and was collected, measured and reintroduced to the reaction flask. The flask was again heated to 150° C. and held at temperature for 4 hours. After 4 hours the temperature was lowered to below 110° C. and all the unreacted benzene and water was allowed to distill off and was collected, measured and reintroduced to the reaction flask. This process of reintroducing the water and benzene, heating to 150° C. for 4 hours, cooling to below 110° C. and distilling off the benzene and water was repeated a third time. Analysis of the final product after the third sequence of reacting and distilling indicated 92.6% conversion of the AOS acid to C14–16 alkylbenzene sulfonic acid. Activity of the product remaining in the flask, determined by CID titration, was found to be 92.5% assuming an equivalent weight of the product of 364. The surface tension at 220° for a 0.10% solution neutralized to pH 7.0 with NaOH was found to be 32.2 mN/m and the CMC was found to be 0.65%. The surface tension at the CMC was 29.5 mN/m and the Draves Wetting time for 0.10% sodium salt of the product was 4.2 seconds. These values indicate the product is an excellent surfactant.

TABLE 5

Material Charge for Example 2

| MATERIAL | MW | AMOUNT,g | MOLE RATIO |
|---|---|---|---|
| Benzene | 78.0 | 78.0 | 1.00 |
| Water | 18.0 | 8.5 | 0.47 |
| Sulfosuccinic Acid | 198.1 | 19.8 | 0.10 |
| AOS Acid | 286.0 | 301.0 | 1.05 |

TABLE 6

Analysis of Product from Example 2

| STEP | BENZENE GRAMS | % CONVERSION | g $H_2O$ | ACID, me/g | CID, me/g | %, ACTIVITY |
|---|---|---|---|---|---|---|
| Before Heating | 78.0 | 0.0 | 8.5 | 1.83 | 1.09 | |
| After 1st Cycle | 17.9 | 77.0 | 8.5 | 2.84 | 2.10 | 76.4 |
| After 2nd Cycle | 10.2 | 86.9 | 8.5 | 3.12 | 2.38 | 86.4 |
| After 3rd Cycle | 5.8 | 92.6 | 8.5 | 3.28 | 2.54 | 92.5 |

EXAMPLE 3

Figure 1:
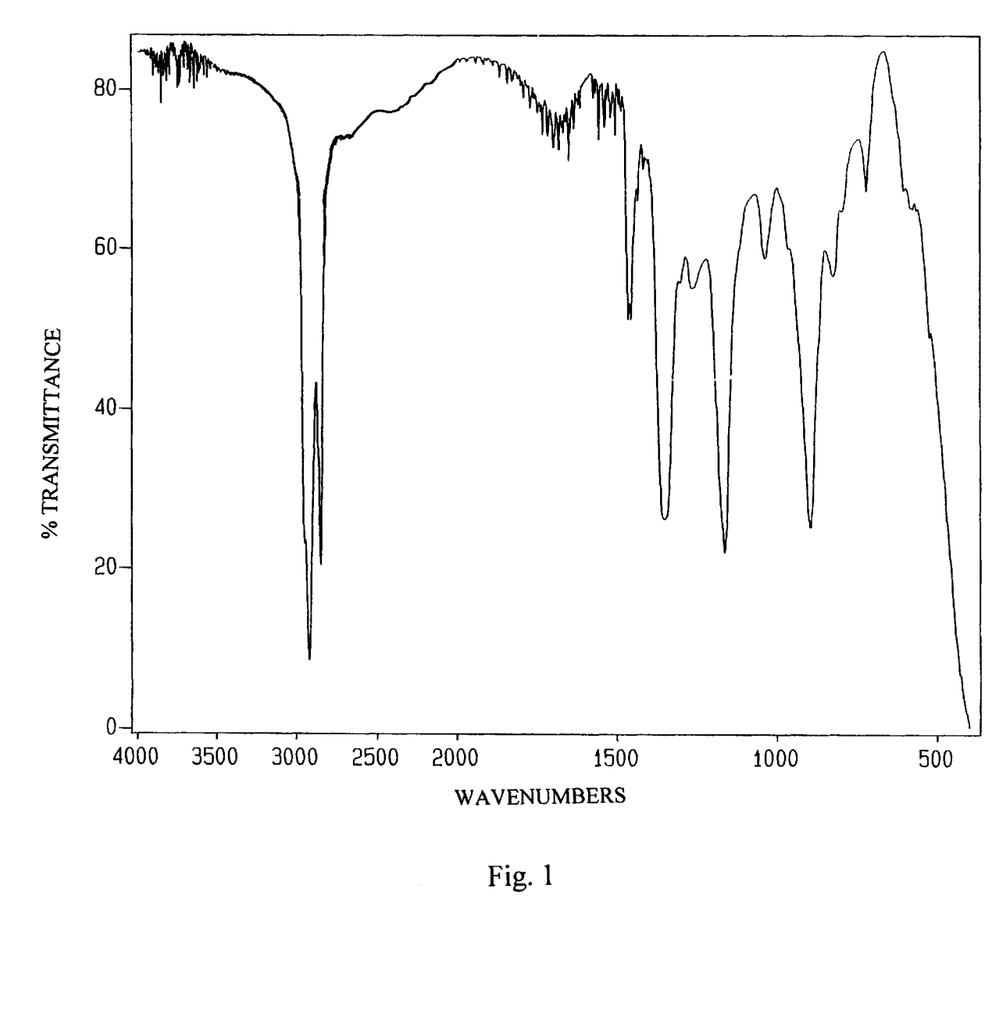
Figure 2:
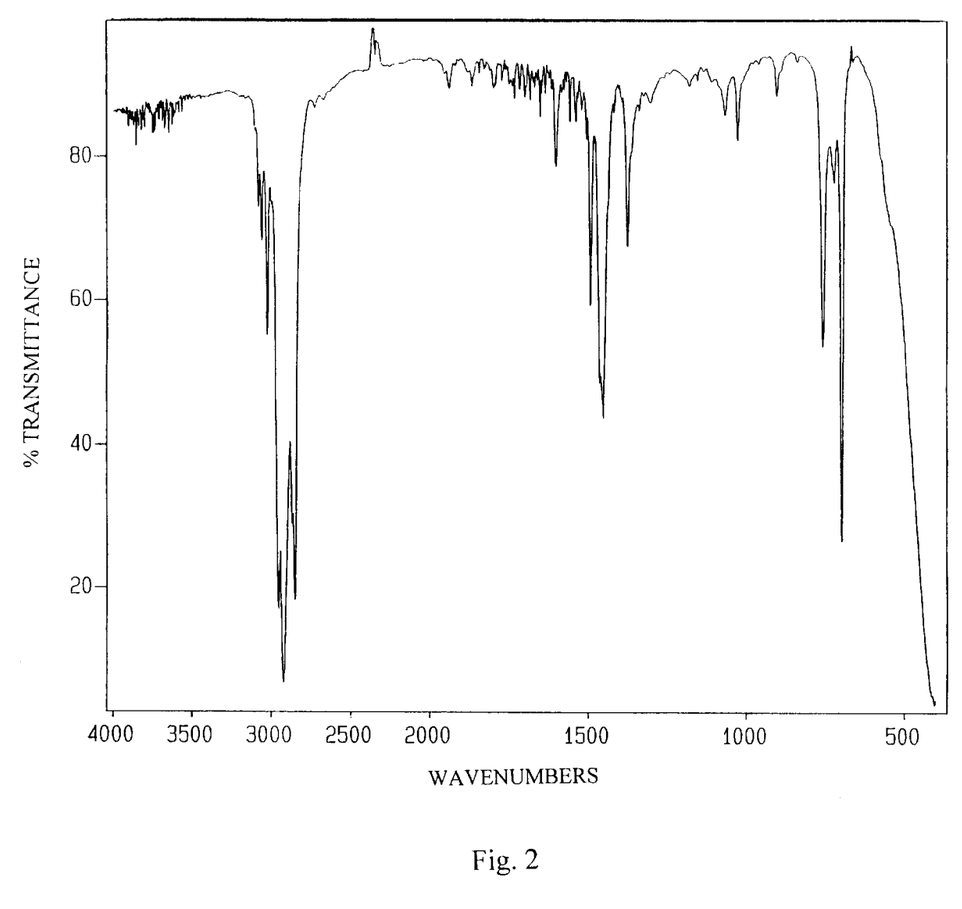
Figure 3:
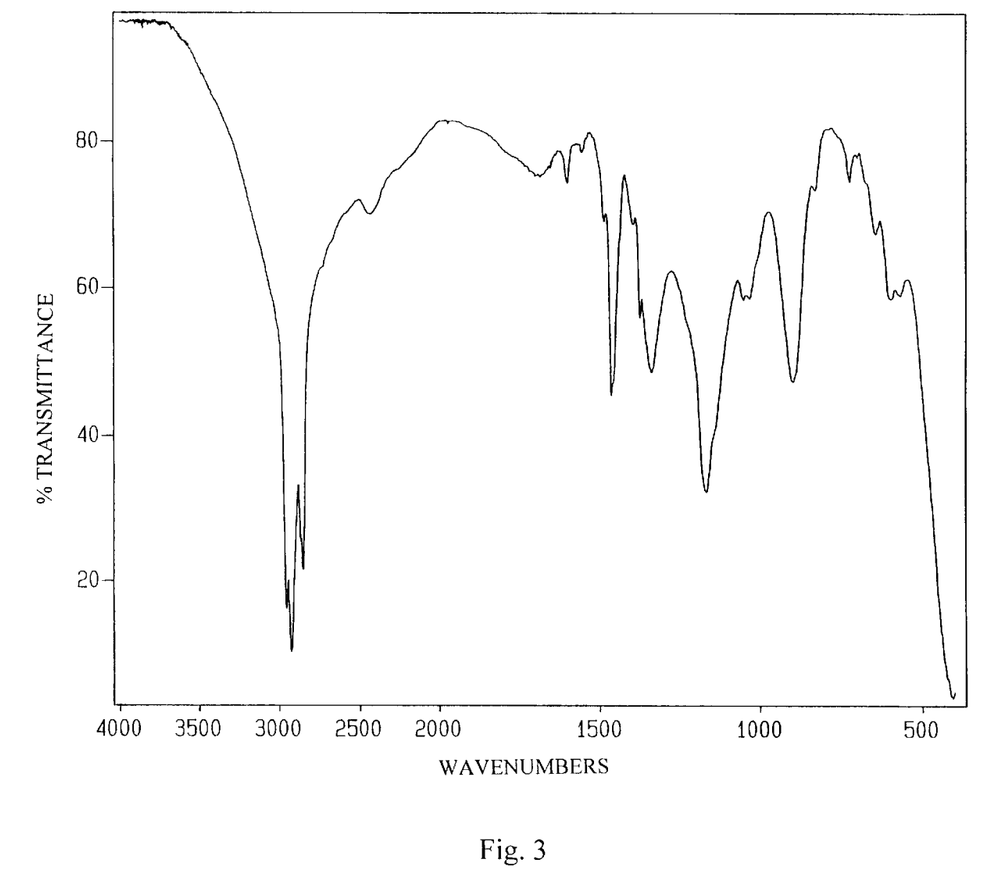

253.5 g alkylbenzene (1.00 Mole) obtained by the HF alkylation of benzene using linear C10–C14 paraffin and having the analysis shown in Table 7 was added to a five necked, 2000 ml round-bottom flask equipped as Example 1. 10.0 g of reagent grade $H_2SO_4$ was added and the stirrer was turned on. 301.0 g (1.05 Mole) AOS acid having the analysis shown in Table 4 above was added and the mixture heated to 140° C. over a two hour period. The charge for Example 3 is shown in Table 8. The mixture was held at 140° C. and periodically analyzed for increasing acid value (AV) until the value remained constant. After the AV remained constant the sample was cooled and the unreacted $H_2SO_4$ was recovered by extracting the sample with an equal volume of deionized water. The amount of $H_2SO_4$ recovered was 9.59 g or 95.9% of the amount added to the reaction. 529.1 g of product were recovered after extracting the $H_2SO_4$ out with water. Analysis of this material gave 96.2% dialkyl benzene sulfonic acid assuming MW of 539. IR curves of the starting materials, AOS (FIG. 1) and Linear Alkylbenzene (FIG. 2) and the final product (FIG. 3) show the loss of sultone bands at 1330–1360, 940, 895 and alkene groups at 1700,1165, 1040, 965 and 910 indicating the conversion of AOS acid into alkylated, alkylbenzene sulfonate.

TABLE 7

Analysis of Linear Alkylbenzene

| PROPERTY | ANALYSIS |
|---|---|
| Appearance | Water white liquid |
| Bromine Index, ppm | 47 |
| Color, Pt-Co | <3 |
| 2-phenyl isomer, Wt % | 15.6 |
| Average Molecular Weight | 253.5 |
| Homologue Distribution, Wt % | |
| <C10 | 0.0 |
| C10 | 1.6 |
| C11 | 7.8 |
| C12 + C13 | 82.2 |
| C14 | 7.6 |
| >C14 | 0.8 |

TABLE 8

Material Charge for Example 3

| MATERIAL | MW | AMOUNT,g | MOLE RATIO |
|---|---|---|---|
| Linear Alkyl Benzene | 253.5 | 253.5 | 1.00 |
| Sulfuric Acid | 98.0 | 10.0 | 0.10 |
| AOS Acid | 286.0 | 301.0 | 1.05 |

EXAMPLE 4

229 g alkylbenzene (1.00 Mole) obtained by the HF alkylation of benzene using propylene tetramer and having the analysis shown in Table 9 was added to a five necked, 2000 ml round-bottom flask equipped as Example 1. 49.0 g of reagent grade $H_2SO_4$ (0.500 Mole) was added and the stirrer was turned on. 301.0 g AOS (1.05 Mole) acid having the analysis shown in Table 4 above was added and the mixture heated to 150° C. over a two hour period. The charge for Example 4 is listed in Table 10. The mixture was held at 150° C. and periodically analyzed for increasing acid value (AV) until the value remained constant. After the AV remained constant the sample was cooled and the unreacted $H_2SO_4$ was recovered by extracting the sample with an equal volume of deionized water. The amount of $H_2SO_4$ recovered was 47.3 g or 96.5% of the amount added to the reaction. 528.5 g of product were recovered after extracting the $H_2SO_4$ out with water. Analysis of this material gave 56.8% dialkyl benzene sulfonate assuming MW of 515.

TABLE 9

Analysis of Branched Alkylbenzene

| PROPERTY | ANALYSIS |
|---|---|
| Appearance | Water white liquid |
| Bromine Index, ppm | 30 |
| Color, Pt-Co | <3 |
| Average Molecular Weight | 229 |
| Homologue Distribution, Wt % | |
| C9 | 3.7 |
| C10 | 2.8 |
| C11 | 9.3 |
| C12 | 65.8 |
| C13 | 15.5 |
| C14 | 2.3 |
| C15 | 0.6 |

TABLE 10

Material Charge for Example 4

| MATERIAL | MW | AMOUNT,g | MOLE RATIO |
|---|---|---|---|
| Branched Alkylbenzene | 229.0 | 229.0 | 1.00 |
| Sulfuric Acid | 98.0 | 49.0 | 0.50 |
| AOS Acid | 286.0 | 301.0 | 1.05 |

EXAMPLE 5

226.0 g phenol with 3 mole EO (1.00 Mole) obtained by the alkylation of phenol using ethylene oxide was added to a five necked, 1000 ml round-bottom flask equipped as Example 1. 295.0 g C16 AOS acid (1.00 Mole) was added and the mixture heated to 150° C. over a two hour period. The charge for Example 5 is Listed in Table 11. The mixture was held at 150° C. and periodically analyzed for increasing acid value (AV) until the value remained constant. These values are shown in Table 12. After the AV remained constant the sample was cooled. 520.7 g of product were recovered. Analysis of this material gave 70.0% alkylphenolethoxy sulfonate assuming MW of 521.

TABLE 11

Material Charge for Example 5

| MATERIAL | MW | AMOUNT,g | MOLE RATIO |
|---|---|---|---|
| Phenol + 3 EO | 226.0 | 226.0 | 1.00 |
| AOS Acid | 295.0 | 295.0 | 1.00 |

TABLE 12

Analysis of Reaction Mixture

| TIME @ 150° C. | ACID VALUE |
|---|---|
| 0 Hours | 59.9 |
| 1 Hours | 62.8 |
| 2 Hours | 73.6 |
| 8 Hours | 75.4 |

EXAMPLE 6

94.0 g phenol (1.00 Mole) was added to a five necked, 1000 ml round-bottom flask equipped as Example 1. 306 g C16 AOS acid (1.04 Mole) was added and the mixture heated to 120° C. over a two hour period. The charge for Example 6 is shown in Table 13. The mixture was held at 120° C. and periodically analyzed for increasing acid value (AV) until the value remained constant (Table 14). After the AV remained constant the sample was cooled and 400 g of product were recovered. Analysis of this material gave 147.8 AV(100% alkyl phenolsulfonate assuming MW of 389). CID titration gave 2.47 meq/g or 405 EW.

TABLE 13

Material Charge for Example 6

| MATERIAL | MW | AMOUNT,g | MOLE RATIO |
|---|---|---|---|
| Phenol | 94.0 | 94.0 | 1.00 |
| AOS Acid | 295 | 306 | 1.04 |

TABLE 14

Analysis of Reaction Mixture from Example 6

| TIME @ 120° C. | ACID VALUE |
|---|---|
| 0 Hours | 70.0 |
| 2 Hours | 146 |
| 3 Hours | 147 |
| Theoretical | 147 |

EXAMPLE 7

Mixtures of natural and synthetic alkylarylsulfonates are used to provide ultra-low interfacial tensions ($<1.0 \times 10^{-2}$ mN/m) when used in combination with various alkali materials such as NaOH or $Na_2CO_3$ and contacted with crude oil. For example, U.S. Pat. No. 4,536,301 issued to Malloy and Swedo on Aug. 20, 1985 uses mixtures of mono and dialkylbenzene sulfonates to obtain ultra-low interfacial tensions against crude oil, U.S. Pat. No. 4,004,638 issued to Burdyn, Chang and Cook on Jan. 25, 1977 uses similar mixtures along with alkali agent to obtain ultra-low IFT and GB 2,232,428 filed by Muijs, Beers, and Roefs on Jun. 6, 1989, uses mixtures of dialkylbenzene alkali sulfonates and polyalkoxyphenyl-ether alkali sulfonates also to obtain low IFT values. All these references claim increased oil recovery by injection of the sulfonate mixtures into subterranean crude oil reservoirs.

The utility of the products of the invention as surfactants for Alkaline Surfactant Polymer Flooding was evaluated in this example using surfactant compositions as formulated below.

FORMULATION A

| | |
|---|---|
| 17.0 g | Isopropanol |
| 5.0 g | Ethylene Glycol |
| 16.4 g | Deionized Water |
| 11.6 g | NaOH(50% aqueous) |
| 30.0 g | Dialkyl Benzene Sulfonate from Example 3 above |
| 20.0 g | Branched Monoalkylbenzene Sulfonic Acid (98% active, E.W. = 309)* |

*Prepared by thin falling film sulfonation using Air/$SO_3$ of alkylbenzene from the HF alkylation of benzene with propylene tetramer.

FORMULATION B

| | |
|---|---|
| 17.0 g | Isopropanol |
| 5.0 g | Ethylene Glycol |
| 16.4 g | Deionized Water |
| 11.6 g | NaOH(50% aqueous) |
| 30.0 g | Dialkyl Benzene Sulfonate, Commercial Source (94.6% active, E.W. = 429) |
| 20.0 g | Branched Monoalkylbenzene Sulfonic Acid (98% active, E.W. = 309)* |

*Prepared by thin falling film sulfonation using Air/$SO_3$ of alkylbenzene from the HF alkylation of benzene with propylene tetramer.

Each of the two surfactant formulations above was diluted to 0.3 wt % with simulated field brine of the composition shown in Table 15. The alkalinity of each sample was adjusted to 0.6 to 1.40 wt % NaOH and the IFT of each sample against a Chinese crude oil at 45° C. was measured using a Model 500 Interfacial Tensiometer from the University of Texas, Austin, Tex.

The results shown in Table 16 below indicate that the dialkylbenzene sulfonate produced by the invention gives ultralow interfacial tensions comparable to and somewhat superior to the heavy alkylbenzene sulfonate produce by the HF process.

TABLE 15

Synthetic Brine Solution

| INGREDIENT | CONC. mg/L |
|---|---|
| $CO_3^{-2}$ | 375 |
| $HCO_3^-$ | 1342 |
| $Cl^-$ | 691 |
| $SO_4^{-2}$ | 4.8 |
| $Ca^{+2}$ | 16 |
| $Mg^{+2}$ | 7.3 |
| $Na^+$ | 1212 |
| Total Dissolved Solids | 3648 |

TABLE 16

Interfacial Tensions Against Crude Oil, 45° C.

| NaOH, WT % | INTERFACIAL TENSION, mN/m FORMULATION A | INTERFACIAL TENSION, mN/m FORMULATION B |
|---|---|---|
| 0.6 |  | $0.7 \times 10^{-3}$ |
| 0.8 | $1.05 \times 10^{-2}$ | $6.5 \times 10^{-3}$ |
| 1.0 | $4.6 \times 10^{-3}$ | $1.6 \times 10^{-2}$ |
| 1.2 | $1.3 \times 10^{-3}$ | $4.3 \times 10^{-2}$ |
| 1.4 | $7.4 \times 10^{-3}$ |  |

The surface properties of the new compounds including low CMCs, low surface and interfacial tensions, and fast wetting times, make them ideal for a wide variety of surfactant applications including emulsifiers, wetting agents, dispersants, foaming agents, hydrotropes, detergents, and cleaners for industries and products such as oil field, agricultural, textile, corrosion inhibition, dye carriers, drilling fluids, lubricants, concrete, and cement.

We claim:

1. An anionic compound comprising: a sulfonated alkylaromatic compound, wherein:

a) the aromatic compound is selected from the group consisting of benzene, mono-substituted aromatic, poly-substituted aromatic, alkylbenzene, alkoxylated benzene, polycyclic aromatic, morno-substituted polycyclic aromatic, poly-substituted polycyclic aromatic, naphthalene, alkylnaphthalene, phenol, alkylphenol, alkoxylated phenol, and alkoxylated alkylphenol; and b) wherein the sulfonated alkyl group attached to the aromatic compound comprises an alkyl group selected from the group consisting of linear or branched alkyl groups of 7 to 30 carbon atoms.

2. The sulfonated alkylaromatic compound as set forth in claim 1 wherein the group attached to the mono-substituted aromatic compound is selected from the group consisting of linear and branched chain alkyl groups of 1 to 30 carbon atoms.

3. The sulfonated alkylaromatic compound as set forth in claim 1 wherein the poly-substituted aromatic compound comprises alkyl groups each selected from the group consisting of linear and branched alkyl groups of 1 to 30 carbon atoms.

4. The sulfonated alkylaromatic compound as set forth in claim 1 wherein said alkoxy group substituted on said aromatic compound is selected from the group consisting of ethylene oxide, propylene oxide, butylene oxide, and combinations of two or more where the number of alkoxylate groups range from 1 to 100.

5. A method of preparing a sulfonated alkylaromatic compound wherein the sulfonate group is attached to the alkyl group comprising the steps: reacting an aromatic compound with an alkene sulfonic acid, to form an alkylaromatic sulfonic acid, wherein:

a) said aromatic compound is selected from the group consisting of benzene, mono-substituted aromatic, poly-substituted aromatic, alkylbenzene, alkoxylated benzene, polycyclic aromatic, mono-substituted polycyclic aromatic, poly-substituted polycyclic aromatic, naphthalene, alkylnaphthalene, phenol, allylphenol, alkoxylated phenol, and alkoxylated alkylphenol and b) wherein the alkene used to form the alkene sulfonic acid comprises an alkyl group selected from the group consisting of linear and branched alkyl groups of 7 to 30 carbon atoms, c) converting sultone present in the alkene back to alkene during the reaction thereby increasing the yield of sulfonated alkylaromatic compound formed by the reaction.

6. The method as set forth in claim 5 wherein the mono-substituted aromatic compound comprises an alkyl group selected from the group consisting of linear and branched chain alkyl groups of 1 to 30 carbon atoms.

7. The method as set forth in claim 5 wherein the poly-substituted aromatic compound comprises alkyl groups each selected from the group consisting of linear and branched alkyl groups of 1 to 30 carbon atoms.

8. The method as set forth in claim 5 wherein said alkoxy group substituted on said aromatic compound is selected from the group consisting of ethylene oxide, propylene oxide, butylene oxide, and combinations of two or more where the number of alkoxylate groups range from 1 to 100.

9. The method as set forth in claim 5 wherein the alkene is an alpha-olefin and containing 7 to 30 carbon atoms.

10. The method as set forth in claim 5 wherein said reaction further comprises the step: adding a catalyst to the reaction mixture of the aromatic compound and the alkene sulfonic acid.

11. The method as set forth in claim 10 wherein said catalyst comprises an acid catalysts.

12. The method as set forth in claim 5 wherein the method of preparation for the alkylaromatic sulfonic acid further combines the step: neutralizing the alkylaromatic sulfonic acid prior to use with one of the following: alkali, alkaline earth and amines.

13. The method as set forth in claim 5 wherein neutralization, and alkylation of the aromatic compound is accomplished simultaneously by adding a catalyst in the form of a salt bearing a cation to the reaction mixture of the aromatic and the alkene sulfonic acid, wherein said cation is selected from a group consisting of Na, K, NH4, Ca, Mg, Ba, and Amines.

14. The method as set forth in claim 13 wherein the catalyst is selected from the group consisting of the alkali salts of weak acids; acetic acid, propionic acid, and carbonic acid.

15. The method as set forth in claim 5 wherein the reaction further comprises a means for converting a higher percentage of the aromatic compound to the alkylaromatic sulfonic acid, wherein the means comprises the additional steps: adding water to the reaction mixture, raising the temperature of the reaction mixture to about 150° C. for about 4 hours, reducing the temperature to about 100° C., distilling essentially all the unreacted aromatic and water from the reaction mixture adding back the water and unreacted aromatic repeating the heating to about 150° C. for about 4 hours, reducing the temperature to about 100° C., and distilling off the unreacted aromatic and water, adding back the water and unreacted aromatic, repeating the heating, distillation and adding steps until essentially all the aromatic compound is converted to the alkylaromatic sulfonic acid.

16. The method as set forth in claim 15 wherein the method of preparation for the alkylaromatic sulfonic acid comprises the step: neutralizing the alkylaromatic sulfonic acid prior to use with one of the following: alkali, alkaline earth and amines.

17. A method of enhanced oil recovery utilizing alkylaromatic sulfonic acids and their salts as surfactants wherein said surfactants comprise:

a) the salt of an alkylaromatic sulfonic acid formed by the reaction of an aromatic compound with an alkene sulfonic acid, wherein the aromatic compound is selected from the group consisting of benzene, mono-substituted aromatic, poly-substituted aromatic, alkylbenzene, alkoxylated benzene, polycyclic aromatic, mono-substituted polycyclic aromatic, poly-substituted polycyclic aromatic, naphthalene, alkylnaphthalene, phenol, alkylphenol, alkoxylated phenol, and alkoxylated alkylphenol, b) wherein the alkene used to form the alkene sulfonic acid comprises an alkyl group selected from the group consisting of linear and branched alkyl groups of 7 to 30 carbon atoms and, c) converting sultone present in the alkene back to alkene during the reaction thereby increasing the yield of sulfonated alkylaromatic compound formed by the reaction and, d) injecting the sulfonated alkylaromatic compound into an oil reservoir to enhance recovery of oil therein.

18. The method of use as set forth in claim 17 wherein the mono-substituted aromatic compound comprises an alkyl group selected from the group consisting of linear and branched chain alkyl groups of 1 to 30 carbon atoms.

19. The method of use as set forth in claim 17 wherein the poly-substituted aromatic compound comprises alkyl groups each selected from the group consisting of linear and branched alkyl groups of 1 to 30 carbon atoms.

20. The method of use as set forth in claim 17 wherein said alkoxy group substituted on said aromatic compound is selected from the group consisting of ethylene oxide, propylene oxide, butylene oxide, and combinations of two or more where the number of alkoxylate groups range from 1 to 100.

21. The method of use as set forth in claim 17 wherein said alkene is an alpha-olefin containing 7 to 30 carbon atoms.

22. The method of use as set forth in claim 17 wherein said reaction further comprises the step: adding a catalyst to the reaction mixture of the aromatic compound and the alkene sulfonic acid.

23. The method of use as set forth in claim 22 wherein said catalyst comprises an acid catalyst.

24. The method of use as set forth in claim 17 wherein the preparation of the alkylaromatic sulfonic acid further comprises the step: neutralizing the alkylaromatic sulfonic acid prior to use with one of the following: alkali, alkaline earth and amines.

25. The method of use as set forth in claim 17 wherein neutralization, and alkylation of the aromatic compound is accomplished simultaneously by adding a catalyst in the form of a salt bearing a cation to the reaction mixture of the aromatic and the alkene sulfonic acid, wherein said cation is selected from a group consisting of Na, K, NH4, Ca, Mg, Ba, and Amines.

26. The method of use as set forth in claim 25 wherein the catalyst is selected from the group consisting of the alkali salts of weak acids; acetic acid, propionic acid, and carbonic acid.

27. The method of use as set forth in claim 17 wherein the reaction further comprises a means for converting a higher percentage of the aromatic compound to the alkylaromatic sulfonic acid, wherein the means comprises the additional steps: adding water to the reaction mixture, raising the temperature of the reaction mixture to about 150° C. for about 4 hours, reducing the temperature to about 100° C., distilling essentially all the unreacted aromatic and water from the reaction mixture, adding back the water and unreacted aromatc, repeating the heating to about 150° C. for about 4 hours, reducing the temperature to about 100° C., and distilling off the unreacted aromatic and water, adding back the water and unreacted aromatic, repeating the heating, cooling, distillation and adding steps until essentially all the aromatic compound is converted to the alkylaromatic sulfonic acid.

28. The method of use as set forth in claim 27 wherein the preparation of the alkylaromatic sulfonic acid further comprises the step: neutralizing the alkylaromatic sulfonic acid prior to use with one of the following alkali, alkaline earth and amines.

* * * * *